March 1, 1932. G. M. AGEE 1,847,076
METHOD OF PREPARING ANIMAL FEED
Filed June 22, 1928 2 Sheets-Sheet 2
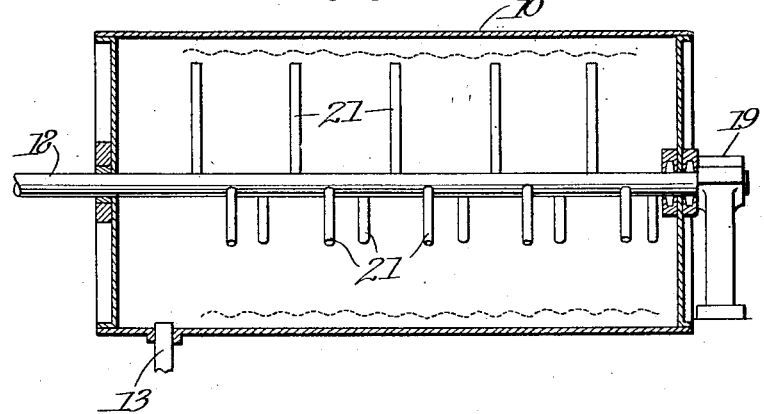
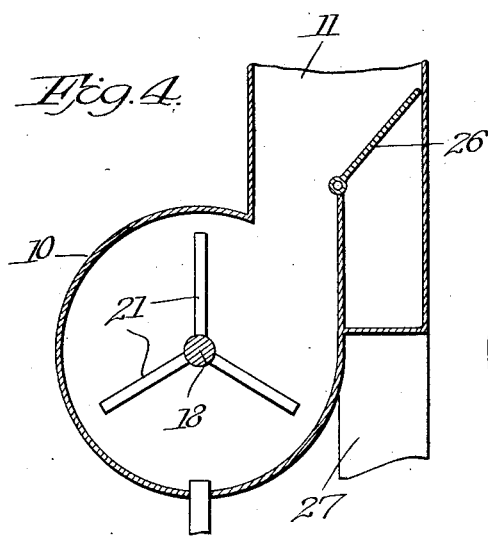
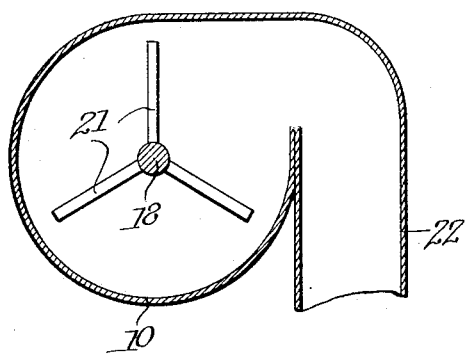
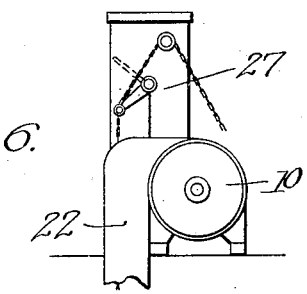
Inventor
George M. Agee Patented Mar. 1, 1932

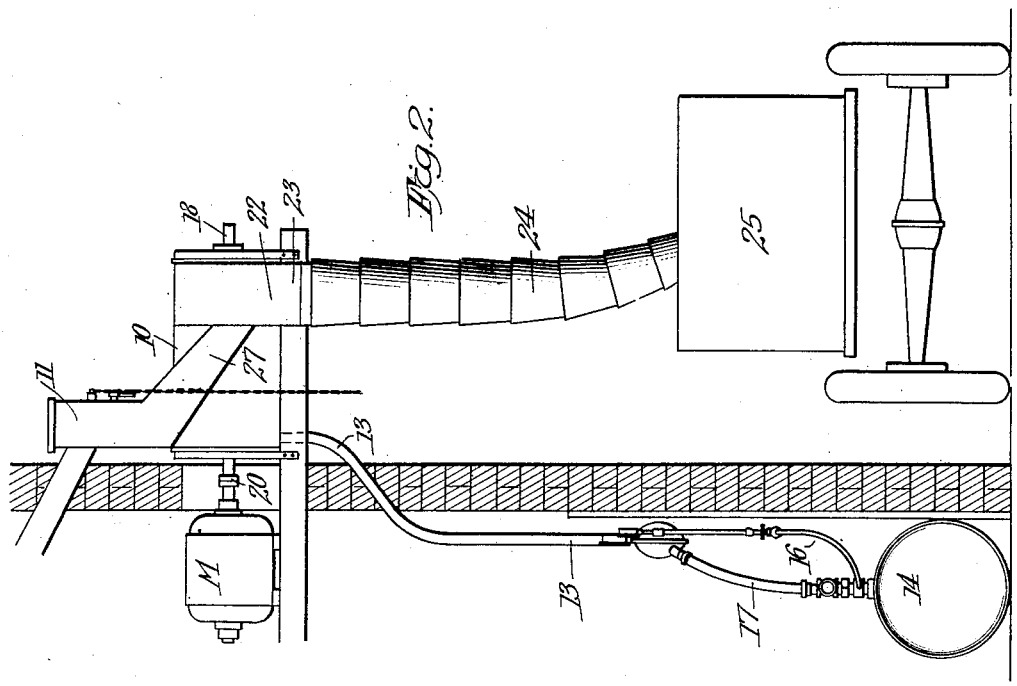
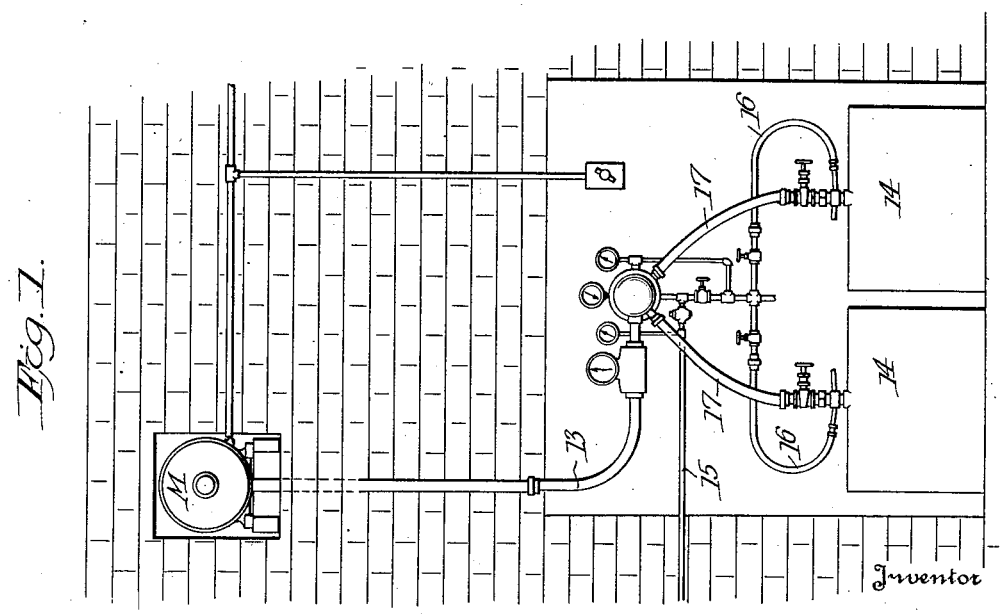

1,847,076

UNITED STATES PATENT OFFICE

GEORGE M. AGEE, OF OWENSBORO, KENTUCKY, ASSIGNOR TO ANGLO-AMERICAN MILL COMPANY, OF OWENSBORO, KENTUCKY, A CORPORATION OF DELAWARE

METHOD OF PREPARING ANIMAL FEED

Application filed June 22, 1928. Serial No. 287,534.

The present invention relates to an improved method of preparing animal feed which was originally described in a copending application Serial No. 224,969 (Patent 1,725,240, August 20, 1929), of which the present case is a division.

Particularly the invention relates to an improved method of preparing "molasses feed" or an animal food in which a suitable grain content is mixed with molasses.

Various means have been provided for mixing grain and molasses as a stock feed, such a sweet feed having become quite popular and found to be very satisfactory for fattening stock, and particularly dairy cattle.

Heretofore it has been generally considered that it was desirable, if not absolutely necessary, to heat the molasses or other form of sweetening liquid, before mixing it with the grain, and the apparatus necessary for carrying out such methods has been relatively expensive to install and operate, and also there has been considerable difficulty in preventing fermentation of the heated molasses and consequent rendering of the product unpalatable to stock.

Further it has been difficult to determine exactly how much molasses or other sweetening liquid should be used to insure that the final product would be of the desired dryness, and to prevent "balling" of such product.

According to the present invention, it is possible to efficiently and satisfactorily provide a sweetened stock food from grain and molasses supplied to the grain at normal atmospheric temperatures, and to obtain a product which is thoroughly mixed and of uniform character throughout, avoiding balling up of the product and formation of relatively large cakes or masses.

This object is obtained by delivering the grain content of the stock feed to a suitable receptacle to which is also delivered, at normal temperature, the molasses or equivalent sweetening content in a solid column or body, without any initial dispersion, and subjecting the two materials within the receptacle to the action of an agitating means, specifically to a centrifugal agitation, which maintains substantially the bulk of the grain content in suspension within the receptacle, and furthermore, which is of very considerable importance, completely breaks up and disperses the solid column of molasses immediately it enters the receptacle, and scatters it, in completely dispersed form, throughout the body of grain.

The product obtained by the improved method is substantially dry and does not have the objectionable sticky quality which has been characteristic of the products of methods heretofore employed in which the molasses is heated prior to being admixed with the grain. Since the molasses is supplied to the mixing receptacle at normal temperatures, and is not thinned out by preliminarily heating the same, it is possible to apply a greater percentage of molasses to a given amount of grain than has heretofore been customary.

In the accompanying drawings there is illustrated an apparatus which has been found to be very effective in carrying out the improved method. Of course, the method may be practiced with apparatus differing in detail from that shown in the drawings, and hereinafter referred to, and many of the parts of such apparatus are illustrated more or less conventionally.

Referring to the drawings:

Figure 1 is an elevation of parts of an apparatus adapted for carrying out the method hereinafter described and claimed.

Figure 2 is a view at right angles to Figure 1.

Figure 3 is a longitudinal sectional view through the mixing receptacle.

Figure 4 is a transverse section through the mixer showing the inlets for the grain and molasses respectively.

Figure 5 is a similar section of the receptacle showing the outlet for the product mixed therein.

Figure 6 is a detail end elevation of a portion of the apparatus.

Referring to the drawings wherein like reference characters designate corresponding parts in the several views, 10 designates the mixing receptacle which, as shown, is preferably round in cross section, and may be of any suitable dimensions.

The receptacle 10 is closed except for the inlets and outlet hereinafter referred to so that the material fed thereto will be confined during treatment.

The feed or grain to be treated is introduced into the receptacle 10 through an inlet 11 which is preferably arranged tangential to the body of the receptacle, as shown, to insure and maintain a proper feeding of the grain to the receptacle. As shown, the grain is supplied directly to the inlet from the grain spout of a mill or storage bin, (not shown). The grain may be supplied to a suitable hopper connected with the inlet by any suitable means.

Within the receptacle, and preferably as shown at the bottom thereof, is arranged an inlet pipe 13 for supplying molasses to the interior of the receptacle, and this inlet pipe preferably extends slightly into the receptacle, projecting above the bottom somewhat to eliminate danger of any feed which may collect at the bottom of the receptacle entering the pipe and choking the flow of molasses therethrough. The pipe 13 is connected with any suitable container for molasses, and in the drawings such container is shown as comprising two casks 14 of the type commonly employed for shipping molasses.

The molasses in the container will be under some pressure supplied through a pipe 15 from any suitable source of pressure, which pipe is connected with the container by connections 16. The molasses passes from the container to the supply pipe 13 through a pipe or pipes 17. Suitable pressure gauges for controlling and determining pressure from the pipe 15 and suitable percentage and volume controls, metering devices and indicators are provided, but as these may be of various forms and do not constitute any part of the present invention, no detailed description or illustration thereof is necessary.

Under the pressure system described, the molasses at normal atmospheric temperatures will be forced through the pipe 13 into the receptacle 10 and delivered into such receptacle in a solid unbroken stream from the end of the pipe which, as before described, projects slightly above the bottom of the receptacle.

Within the receptacle 10 is mounted a shaft 18, preferably centrally disposed, and mounted in suitable bearings. Experience has shown that as illustrated, the bearing 19 at the tail end of the shaft is sufficient to properly support the shaft, the head of the shaft being coupled by a suitable coupling 20 connected to the shaft of the motor M which may be of any suitable or desired type but, preferably, is an electric motor.

The shaft 18 is provided within the receptacle with a series of radially disposed arms 21, the preferable arrangement being a spiral disposition of the arms along the shaft, and I have found that an angular relation of approximately 120° between the arms is a satisfactory one. The arms will, of course, be of different lengths, depending on the size of the receptacle, and they should be spaced apart longitudinally of the shaft approximately one-third of their lengths. It has been found that when spaced at approximately this distance good results are secured and that if the arms are set too closely to one another, there is a tendency to develop a continuous spiral which will not provide sufficient agitation of the feed to produce the desired mixture. If the arms are spaced too widely from one another, insufficient agitation is provided, as such an arrangement leaves the areas between the arms of such dimensions that the agitation is materially cut down. It will be understood, of course, that other arrangements of the arms with respect to the shaft and to one another may be made, but the arrangement illustrated and described has been found to give satisfactory results.

The shaft 18 is driven from the motor M at a relatively high speed, and while various speeds may be employed, I have found that a speed of approximately one thousand R. P. M. is a very satisfactory one for usual working conditions. The revolution of the shaft 18 and its arms 21 sets up a violent agitation of the contents of the receptacle, such agitation being more particularly in the form of centrifugal agitation, tending to create a vortex along the axis of the shaft, and also to maintain the grain content in a constant state of agitation and suspension. The arms 21 are of such length that the ends thereof are always spaced a reasonable distance from the wall of the receptacle 10. It has been found that in an apparatus having a receptacle of approximately seventeen inches in diameter there should be a clearance of approximately two inches between the ends of the arms and the wall of the receptacle. The distance between the ends of the arms 21 and the wall of the receptacle may be varied with receptacles of different diameters, it being desirable always, however, to provide a considerable clearance between the ends of the arms and the receptacle wall.

As the arms 21 are rotated by the shaft 18, the bulk of the grain within the receptacle is maintained in agitation and suspension as stated, a small part of it, as the agitation continues, lying against the wall of the receptacle in the riffled condition represented by the dotted lines in Figure 3.

After the machine has been put in operation for a short time, this riffled condition becomes a fixed condition and the mixed feed and molasses will build up on the wall of the receptacle in the spaces between the paths of the arms 21, so as to provide the alternating ribs and grooves and giving the interior surface of the receptacle the riffled form indicated. The formation of the layer of mixed materials on the inner surface of the drum, having the riffled face just described, has been found to be of considerable value in effecting the desired thorough mixture of the grain and molasses. It is believed that the heat generated by the frictional contact between the grain passing over such riffled surface and the rotation of the arms 21 acts to assist in the thorough mixing of the molasses with the feed. As both the grain and molasses are introduced into the receptacle at atmospheric or normal temperatures, the heat produced by the agitation and friction referred to will be uniform and there will not be the relatively great differences in temperature between the grain and the molasses that are present when the molasses is, as customary, preliminarily heated before its introduction into the receptacle. By thus slightly raising the temperature of both the molasses and grain and having the increase in temperature of both ingredients of the feed uniform, I have found that the resulting product is superior to that which has heretofore been obtained when grain was mixed with molasses that had been preliminarily heated, before being introduced into the receptacle.

By the process described in which a deposit of the mixed materials is provided on the interior surface of the drum and the form of such deposit is utilized to assist in raising the temperature of the material, it is possible to utilize a relatively cheap and readily manufactured cylinder having a smooth interior, as the mixing receptacle, and the necessity of providing the interior of the cylinder with preformed corrugations is avoided. It has been found in the use of the apparatus described that after the corrugated formation has been provided and the machine has been in use for a short period, the lining becomes set and hardened so that it becomes a part of the interior formation and make-up of the cylinder or receptacle.

As previously noted, the molasses is delivered from the pipe 13 into the receptacle 10 in a solid unbroken column and at normal temperatures without being preliminarily heated. The compression or pressure employed for forcing the molasses into the receptacle 10 is sufficient merely to deliver the molasses in a steady stream through the pipe 13 without spraying or dispersing it. The pipe 13 is of relatively large size, and in fact, is oversize for the volume of molasses to be delivered, in order that the molasses may be fed through such pipe, even at low temperatures, without the necessity of any extreme compression or pressure. The molasses, as stated, is delivered at normal atmospheric temperature without being preliminarily heated, and I have found that molasses kept at a temperature of 60° F., which can be maintained if it is stored in underground tanks or vats, gives very satisfactory results and provides a superior product.

As the unbroken column of molasses passes from the pipe 13 into the receptacle 10 it is at once subjected to the action of the agitating means within the receptacle, and by reason of the centrifugal action of the arms 21 and the vortex created centrally of the receptacle by such rapidly revolving arms, the solid column of molasses is instantly broken up and dispersed through the agitating area where it combines, while in suspension, with the suspended particles of feed in a thorough and uniform manner, the result being a very complete and intimate mixture of the feed and molasses.

The method is a continuous one in that the feed and molasses are being continuously introduced into the receptacle 10 and the finished product is continuously passing out from the outlet 22 at the tail end of the receptacle. The outlet 22 is preferably arranged tangentially of the receptacle in a manner similar to the inlet 11, it having been found that under the high speeds at which the machine is preferably operated, a tangential feed and tangential delivery is preferable to that obtained if radial inlet and outlet openings are provided. If the inlet and outlets are radially disposed there is a tendency at the inlet end to force the feed back rather than to draw it into the mixing receptacle and at the outlet end there is a tendency to sweep the finished product past a radial outlet whereas with the inlet and outlet arranged tangentially the feed will be readily drawn in and readily leave the receptacle.

In the apparatus shown, the product delivered from the receptacle passes through a down spout 23 and by means of any suitable delivery chute 24 may be delivered as desired, as, for example, to a truck 25. The particular apparatus shown is provided with means by which, if desired, feed or grain from the supply spout may be delivered directly to the delivery chute 24 without passing through the mixing receptacle. For this purpose a by-pass duct 27 connects the conduit leading from the spout to the inlet 11 of the receptacle 10 with the outlet conduit 23 and a manually movable gate is provided for directing the feed or grain into the inlet 11 of the receptacle 10 or to said by-pass conduit 27 as desired.

The method hereinbefore described is adapted to be employed with any form of grain, either whole grain or grain which has been crushed at a suitable mill, and cold molasses. The result is a very superior and uniformly mixed sweetened feed, the particles of which are light, dry, and flocculent as is highly desirable. By the method also, it is possible to apply a relatively larger proportion of sweetening to the feed than has been heretofore accomplished, and all danger of fermentation, which has frequently resulted where molasses is preliminarily heated, is avoided.

While I have herein referred to molasses as the sweetening element of the mixed feed, it will be understood that this term is intended to cover not only that particular ingredient, but any other suitable sweetened liquid.

What I claim is:

1. The herein described method of preparing a sweetened food for live stock, which consists in continuously supplying animal feed and molasses at normal temperature to a receptacle having a suitable outlet, and stirring said materials to commingle the particles thereof and initially form a corrugated surface extending to the receptacle outlet, and which surface sets or becomes hardened, and subsequently forcing the commingled particles over said corrugated surface and through the outlet, thereby generating heat which assists in effecting the mixture.

2. The method of forming a corrugated wall in a receptacle, which consists in introducing into the receptacle animal feed and molasses, subjecting said materials to the action of rapidly revolving arms, whereby the material is deposited in alternate circumferential ribs and grooves upon the wall of the receptacle.

In testimony whereof I have hereunto set my hand.

GEORGE M. AGEE.